United States Patent
Bazrafkan et al.

(10) Patent No.: US 10,546,231 B2
(45) Date of Patent: Jan. 28, 2020

(54) METHOD FOR SYNTHESIZING A NEURAL NETWORK

(71) Applicant: FotoNation Limited, Galway (IE)

(72) Inventors: Shabab Bazrafkan, Galway (IE); Joe Lemley, Galway (IE)

(73) Assignee: FotoNation Limited, Galway (IE)

( * ) Notice: Subject to any disclaimer, the term of this patent is extended or adjusted under 35 U.S.C. 154(b) by 471 days.

(21) Appl. No.: 15/413,283

(22) Filed: Jan. 23, 2017

(65) Prior Publication Data

US 2018/0211155 A1 Jul. 26, 2018

(51) Int. Cl.
*G06N 3/04* (2006.01)

(52) U.S. Cl.
CPC .................. *G06N 3/0454* (2013.01)

(58) Field of Classification Search
CPC ....... G06N 3/0454; G06N 3/082; G06N 3/084
See application file for complete search history.

(56) References Cited

U.S. PATENT DOCUMENTS

| | | | |
|---|---|---|---|
| 9,569,869 B2 * | 2/2017 | Hesse | G06T 11/206 |
| 2015/0278642 A1 * | 10/2015 | Chertok | G06N 3/02 382/156 |
| 2018/0150740 A1 * | 5/2018 | Wang | G06T 7/11 |

FOREIGN PATENT DOCUMENTS

| | | |
|---|---|---|
| WO | 2017/032468 A1 | 3/2017 |
| WO | 2017/108222 A1 | 6/2017 |
| WO | 2017/129325 A1 | 8/2017 |

OTHER PUBLICATIONS

Niepert et al., "Learning Convolutional Neural Networks for Graphs," 2016, vol. 48, 10 pages (Year: 2016).*
A. Rahman and S. Tasnim, "Ensemble Classifiers and Their Applications: A Review", International Journal of Computer Trends and Technology (IJCTT) 10(1):31-35, Apr. 2014.
V. Badrinarayana, A. Kendall, and R. Cipolla, "SegNet: A Deep Convolutional Encoder-Decoder Architecture for Image Segmentation," CoRR, vol. abs/1511.00561, 2015.
Szegedy, et al., "Going Deeper with Convolutions", IEEE Conference on Computer Vision and Pattern Recognition (CVPR), 2015.
Szegedy, et al., "Rethinking the Inception Architecture for Computer Vision" Computer Vision and Pattern Recognition, arXiv:1512.00567, Dec. 2015.
Chollet, Francois, "Deep Learning with Separable Convolutions", Computer Vision and Pattern Recognition arXiv:1610.02357, Oct. 2016.

* cited by examiner

*Primary Examiner* — Daniel C Puentes (57) ABSTRACT

Synthesizing a neural network from a plurality of component neural networks is disclosed. The method comprises mapping each component network to a respective graph node where each node is first labelled in accordance with the structure of a corresponding layer of the component network and a distance of the node from one of a given input or output. The graphs for each component network are merged into a single merged graph by merging nodes from component network graphs having the same first structural label. Each node of the merged graph is second labelled in accordance with the structure of the corresponding layer of the component network and a distance of the node from the other of a given input or output. The merged graph is contracted by merging nodes of the merged graph having the same second structural label. The contracted-merged graph is mapped to a synthesized neural network.

9 Claims, 11 Drawing Sheets

METHOD FOR SYNTHESIZING A NEURAL NETWORK

RELATED APPLICATIONS

The present invention relates to co-filed U.S. application Ser. No. 15/413,312 entitled "A method of training a neural network", PCT Application No. PCT/EP2016/060827 filed 13 May 2016, PCT Application No. PCT/EP2016/074519 filed 12 Oct. 2016 and PCT Application No. PCT/EP2016/081776 filed 19 Dec. 2016 the disclosures of which are incorporated by reference.

FIELD

The present invention relates to a method for synthesizing a neural network.

BACKGROUND

In recent years, Deep Neural Networks (DNN) have been used in a range of machine learning and data-mining applications. These networks comprise sequential signal processing units including, for example, either convolutional layers or fully connected layers, typically accompanied by pooling or regularization tasks:

A Convolutional Layer convolves, for example, an image "I" (in general nD) with a kernel "W" (in general n+1D) and adds a bias term "b" (in general nD) to it. The output is given by:

$$P = I * W + b$$

where * operator is (n+1)D convolution in general. Typically, n=3, but for time series applications, n could be 4. The convolution output P is then typically passed through an activation function. During training, the kernel and bias parameters are selected to optimize an error function of the network output.

A Fully Connected Layer is similar to classical Neural Network (NN) layers where all the neurons in a layer are connected to all the neurons in their subsequent layer. The neurons give the summation of their input multiplied by their weights and this is then passed through their activation functions.

Both convolution layers and fully-connected layers are especially useful in pattern recognition due to their nonlinear activation functions.

A Pooling Layer applies a (usually) non-linear transform (Note that "average pooling" is a linear transform, but the more popular "max-pooling" operation is non-linear) on an input image to reduce the size of the data representation after a previous operation. It is common to put a pooling layer between two consecutive convolutional layers. Reducing the spatial size leads to less computational load and also prevents the over-fitting as well as adding a certain amount of translation invariance to a problem.

Regularization prevents overfitting inside a network. One can train a more complex network (using more parameters) with regularization and prevent over-fitting while the same network would get over-fitted without regularization. Different kinds of regularizations have been proposed including: weight regularization, drop-out technique and batch normalization. Each of them has their own advantages and drawbacks which make each one more suitable for specific applications.

In ensemble classifiers, such as disclosed in A. Rahman and S. Tasnim, "Ensemble Classifiers and Their Applications: A Review", International Journal of Computer Trends and Technology (IJCTT) 10(1):31-35, April 2014, different classifiers (or models) are trained for a given problem individually and placed in parallel to form a larger classifier. The results from all of the classifiers can thus be used to take a final decision.

Figure 1:
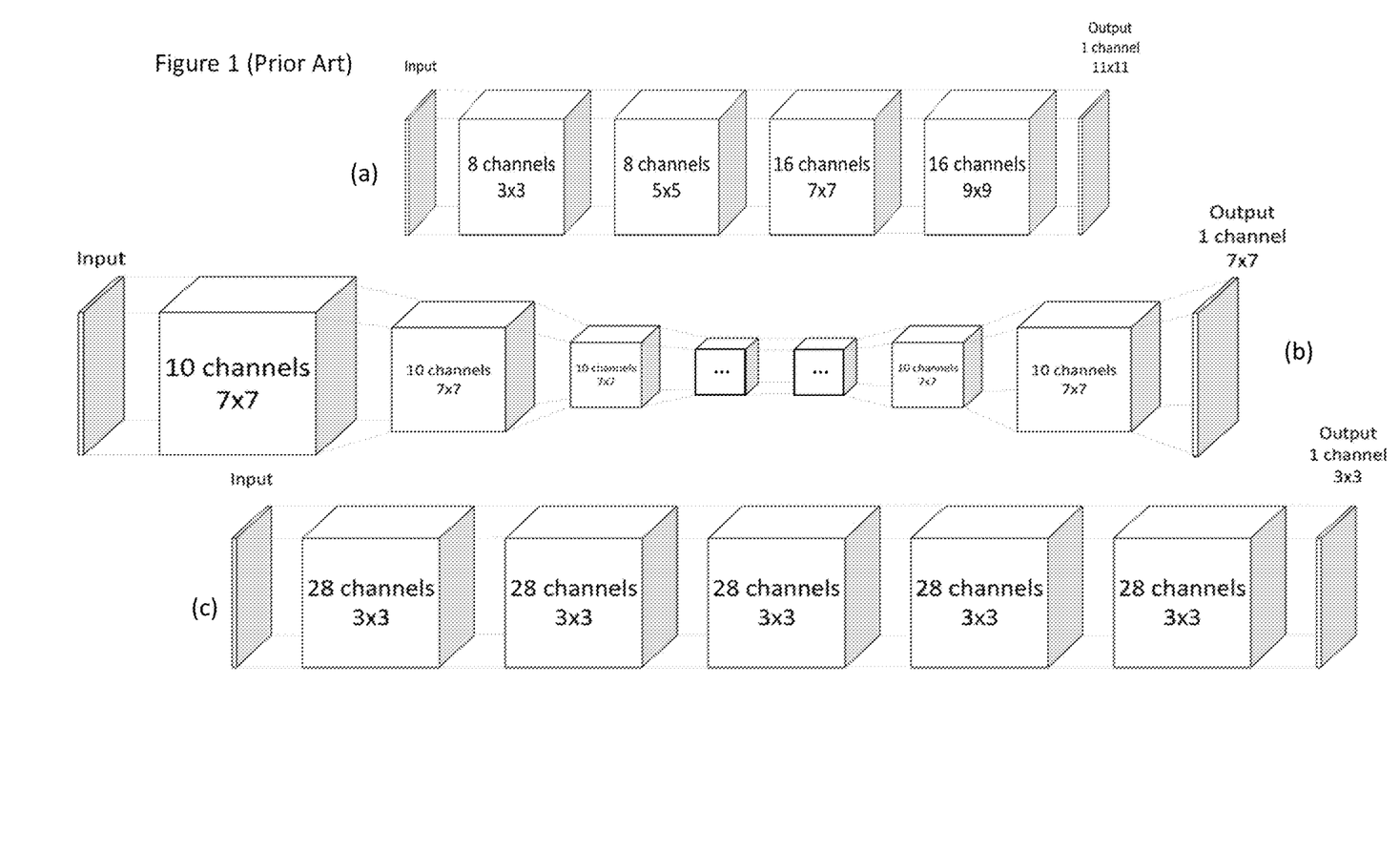
FIG. 1 shows a number of conventional neural networks which can be applied in parallel to a given input.

Take for example, the problem of low quality iris image segmentation:

A first network which might be employed for this task is a 5 layer (including the output layer) fully convolutional neural network such as shown in FIG. 1(a). The first two layers have 8 channels and the second two layers have 16 channels. The kernel size increases for each layer starting with 3×3 for the first layer and 11×11 for the output layer. No pooling is used in this network, and batch normalization is used after each convolutional layer.

The second model is a reduced size SegNet basic model such as shown in FIG. 1(b), see V. Badrinarayanan, A. Kendall, and R. Cipolla, "SegNet: A Deep Convolutional Encoder-Decoder Architecture for Image Segmentation," CoRR, vol. abs/1511.00561, 2015. This model is a fully convolutional architecture comprising 8 layers. Each layer has 10 channels and max pooling is used in the first four layers. The last four layers use the indices from their corresponding pooling layer in order to accomplish an un-pooling operation. A 7×7 kernel size is used in all layers and batch normalization is again used after each convolutional layer to avoid overfitting and provide faster convergence.

The third network designed for the problem in hand is a 6 layer fully convolutional network shown in FIG. 1(c). Each layer has 28 channels and a 3×3 kernel size is used in all layers. No pooling is used in the network and again batch normalization is used after each convolutional layer.

An extended CASIA 1000 dataset available from http://biometrics.idealtest.org can be used to train the three different models, with each having almost the same number of parameters.

So while each of these networks can provide results of limited usefulness, it will be seen that in order to deploy the three networks with a view to combining their outputs and so avail of their combined approaches, the number of resources required increases in proportion to the number of component networks.

"Going Deeper with Convolutions", Christian Szegedy et al, IEEE Conference on Computer Vision and Pattern Recognition (CVPR), 2015; "Rethinking the Inception Architecture for Computer Vision" Christian Szegedy et al, Computer Vision and Pattern Recognition, arXiv:1512.00567, December 2015; and "Deep Learning with Separable Convolutions", Francois Chollet, Computer Vision and Pattern Recognition arXiv:1610.02357, October 2016 discuss GoogLeNet and Xception, deep neural networks based on the Google Inception architecture. These architectures aim to improve utilization of computing resources in a neural network by increasing the depth and width of the network.

Figure 2:
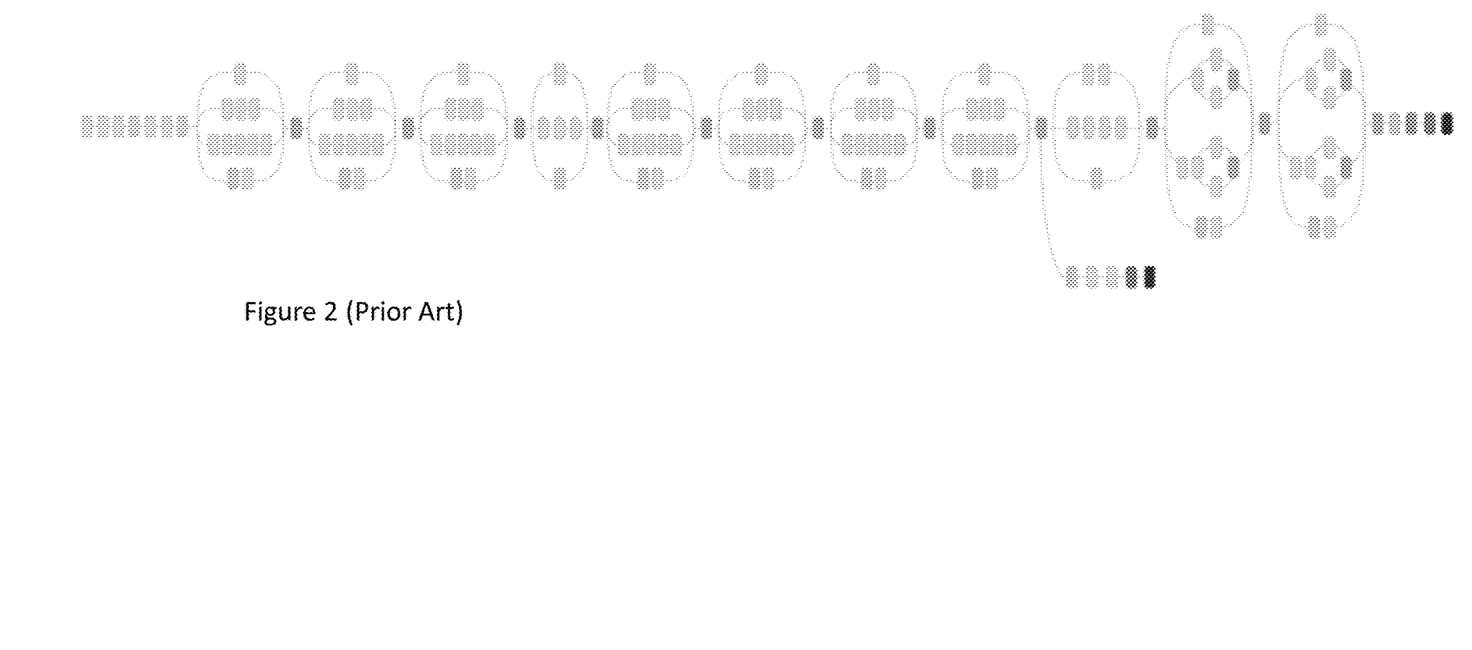
FIG. 2 shows the results of a Google Inception approach to merging such networks.

Using this approach, the above three networks might be combined into a 22 layer convolutional network with minimally sized kernels as shown in FIG. 2 where each node represents a convolutional layer, pooling layer, fully connected layer etc.

However, such rationalization of the component networks can mean that beneficial characteristics of the component networks such as their large kernel size can be lost.

It is an object of the present invention to provide an improved method of synthesizing a neural network which better preserves the characteristics of the component networks while rationalizing the resources required for the synthesized network.

SUMMARY

According to the present invention, there is provided a method for synthesizing a plurality of component neural networks according to claim 1.

Embodiments of the present invention map the layers of a number of component neural networks which might otherwise execute independently or in parallel into respective graph nodes. In some embodiments, each node is first labelled according to its distance from the network input to output. A first optimization can then be applied before labelling the nodes of the optimized network according to their distance from the network output. A second network optimization can then be applied. The nodes of the twice optimized network are then mapped back to respective layers of a synthesized neural network. This network can then be trained in a conventional fashion to arrive at a trained synthesized network providing results which can be at least as good as for those of the component networks, but requiring fewer computing resources.

Embodiments of the present invention can maintain the overall structure of the component networks within the synthesized network. So, for example, if a component network employs a large kernel say 13×13, the synthesized network will preserve that structure. On the other hand, approaches based on Google Inception try to break down larger kernels within parallel component networks into smaller kernels in an attempt to rationalise the component networks, so losing the benefit of these aspects of the component networks.

The number of the layers in synthesized networks produced according to the present invention is typically less than or equal to the number of the layers in the component networks, by contrast with Google Inception which tends to increase the number of the layers in the network (it breaks down each layer into several layers with smaller kernels).

DESCRIPTION OF THE DRAWINGS

Embodiments of the invention will now be described, by way of example, with reference to the accompany drawings, in which.

DESCRIPTION OF THE EMBODIMENTS

Figure 3:
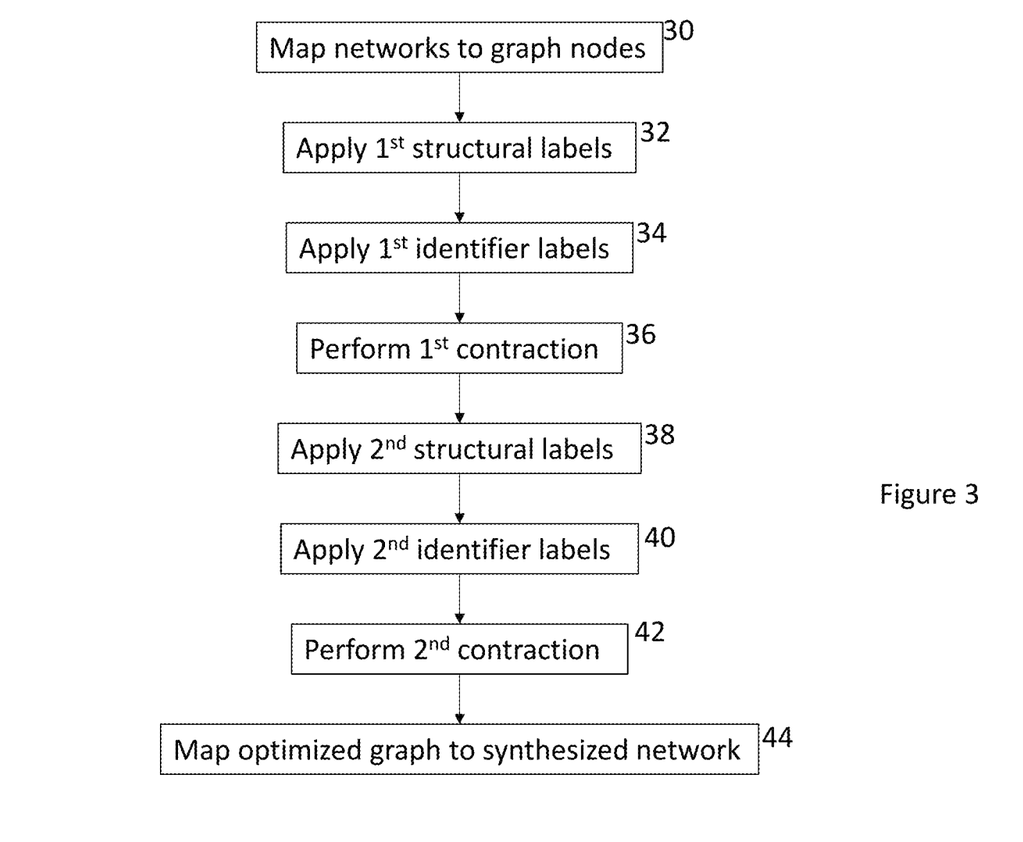
FIG. 3 is a flow diagram illustrating a method for synthesizing a neural network according to an embodiment of the present invention.

Referring now to FIG. 3 there is shown a method for synthesizing a neural network according to an embodiment of the present invention. The method takes a number of component networks to provide a single synthesized network requiring fewer resources than those of the component networks, yet capable of producing results as good as for those of the combined component networks.

Figure 4:
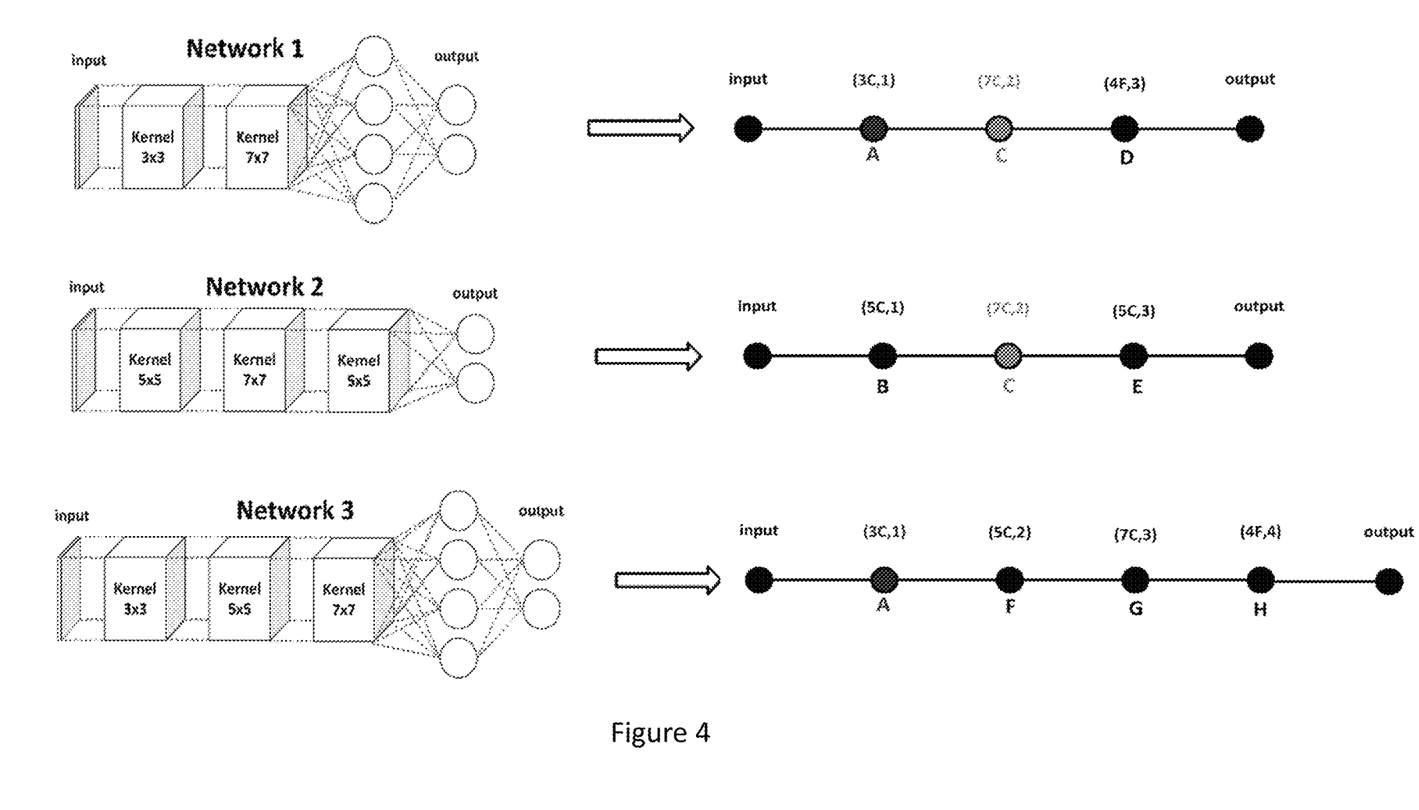
FIG. 4 shows the mapping of three different networks designed for a specific binary classification task to corresponding graphs according to an embodiment of the present invention—the properties for each graph node being indicated on top of the nodes in tuple form (layer structure, distance from input) and nodes with the same property values being allocated the same identifier label A . . . H.

Referring now to FIG. 4, there is shown 3 exemplary neural networks, each comprising a plurality of layers connecting an input to an output layer. While any number of component networks of any complexity can be employed, for the purposes of the present disclosure, relatively simple networks are shown. In the case of Network 1, two convolution layers with 3×3 and 7×7 kernels respectively are applied before a fully connected layer which provides a final output. In the case of Network 2, a convolution layer with a 5×5 kernel is followed by a convolution layer with a 7×7 kernel and a convolution layer with a 5×5 kernel. In the case of Network 3, a convolution layer with a 3×3 kernel is followed by a convolution layer with a 5×5 kernel and a convolution layer with a 7×7 kernel before a final fully connected layer. In the example of FIG. 4, the three different networks perform a binary classification task indicated by the 2 node output layer.

In a first step 30 of the method of FIG. 3, each of the component Networks 1-3 is mapped to a corresponding graph. In order to do so:

1. Each layer of the network is considered as a node of the graph; and
2. Each node of the graph is connected to other nodes based on the connection of their corresponding layers in the original component network. If two layers A and B are connected in the network—two nodes A and B will be connected in the corresponding graph.

In step 32, each graph node is provided with a structure label based on the properties of the corresponding layer in the original component network. An exemplary structure labeling format comprises a tuple described below:

a. The first tuple property of each layer is its structure. For a convolutional layer, this includes the kernel size; for a pooling/un-pooling layer the pool size; and for a fully connected layer, the number of neurons. In FIG. 4, C stands for convolutional, F for fully connected P for pooling and U for un-pooling. 3C means a convolutional layer with kernel size 3×3, 4F means a fully connected layer with 4 neurons, and 2P means a 2×2 pooling layer.

b. The second property of each layer is its distance from its input in the graph. Thus, the tuple (5C, 3) means a convolutional layer with a 5×5 kernel which has distance 3 from the input node.

Note that the above structure labelling convention is provided for exemplary purposes only and any suitable equivalent could be employed.

Once structural labels have been allocated to each graph node, the procedure continues in step 34, by attempting to identify nodes with the same structural labels. So if both tuple properties for a pair of nodes match, a common identifier label will be assigned to each of them.

Thus, in FIG. 4, right hand side, identifier labels A, B . . . H have been applied to nodes with tuples (3C,1), (5C,1) . . . (4F,H) respectively.

The process now continues by contracting the vertices of the three component graphs shown in FIG. 4, right hand side, to provide a simpler optimized graph with fewer nodes, step 36.

In the example of FIG. 4, all input nodes have the same common input and all output nodes have a common output, although in more complicated examples, it is possible that more than one input and more than one output might be provided. In this case, the second tuple property would need to indicate each input/output for which a distance is indicated.

Now, all nodes with the same identifier label are merged and any parallel edges are removed.

Figure 5:
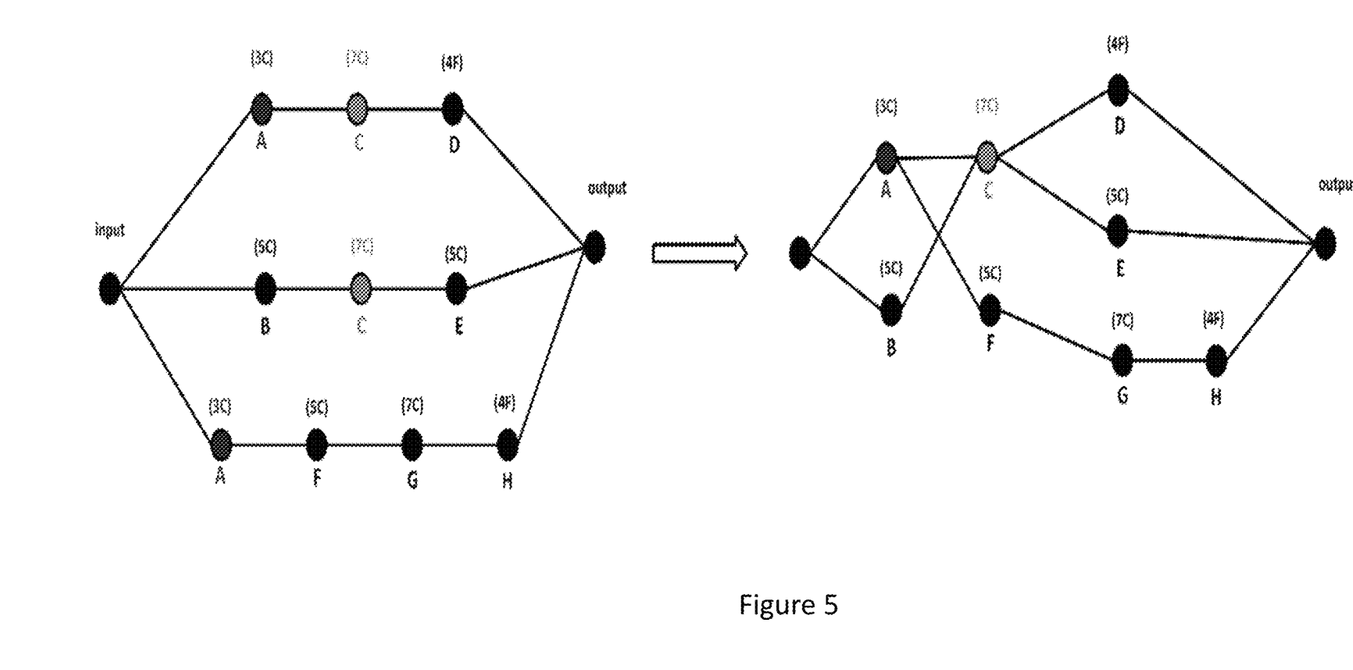
FIG. 5 illustrates merging of the nodes of the network of FIG. 4 in a first optimisation performed according to an embodiment of the present invention.

This graph contraction of the graphs shown in FIG. 1, right hand side, results in the optimised graph shown in FIG. 5 right hand side.

The contraction can be seen between the input and nodes labelled A; and between nodes labelled A and B and nodes labelled C.

Figure 6:
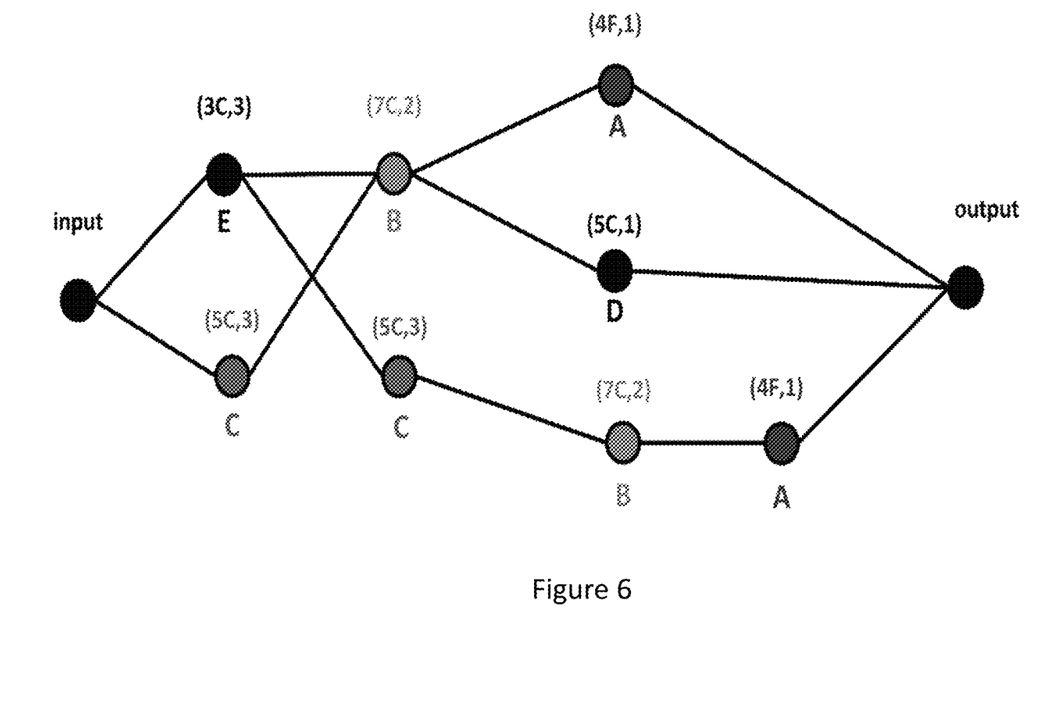
FIG. 6 illustrates the labelling of the optimized nodes of FIG. 5 according to their distance from the output (The properties for each node are indicated on top of the nodes in tuple form (layer structure, smallest distance to output), nodes with the same properties getting the same label A . . . E)

Referring now to FIG. 6, the process continues in step 38, by applying a second set of structural labels to the nodes of the optimized graph of FIG. 5. In this step, structural labelling is done from output to input. Thus, while graph structure remains the same as the previous step, the tuple properties of each node will be (layer structure, smallest distance from its output node).

Again, identifier labels are applied to nodes with the same structural labels, step 40, nodes with the same tuple property values getting the same identifier label. Thus, identifier labels A . . . E are applied to nodes with tuples (4F,1) . . . (3C,3) respectively as shown in FIG. 7, left hand side.

Figure 7:
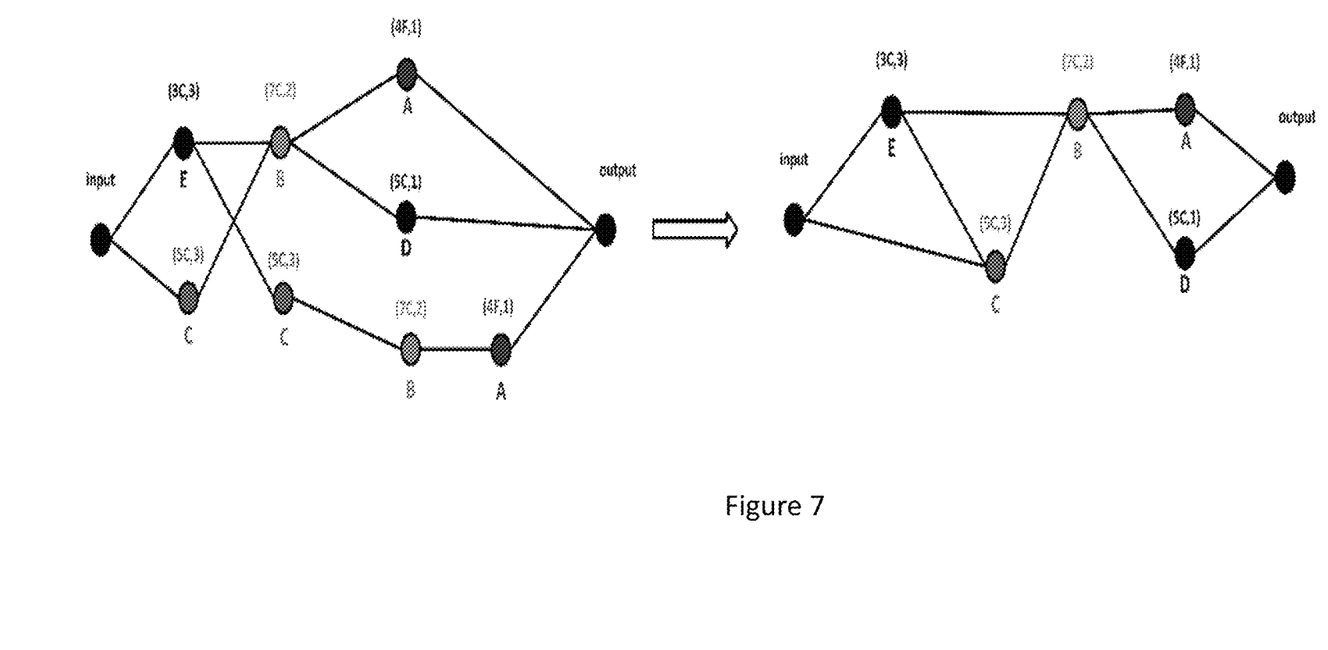
FIG. 7 illustrates merging of the nodes of the graph of FIG. 6 in a second optimisation performed according to an embodiment of the present invention.

Again, at step 42, graph contraction is applied to this first optimized graph to provide a second optimized graph as shown in FIG. 7, right hand side. Thus, again nodes with the same label are merged, as in the case of nodes labelled A, B and C, and any parallel edges are removed.

Figure 8:
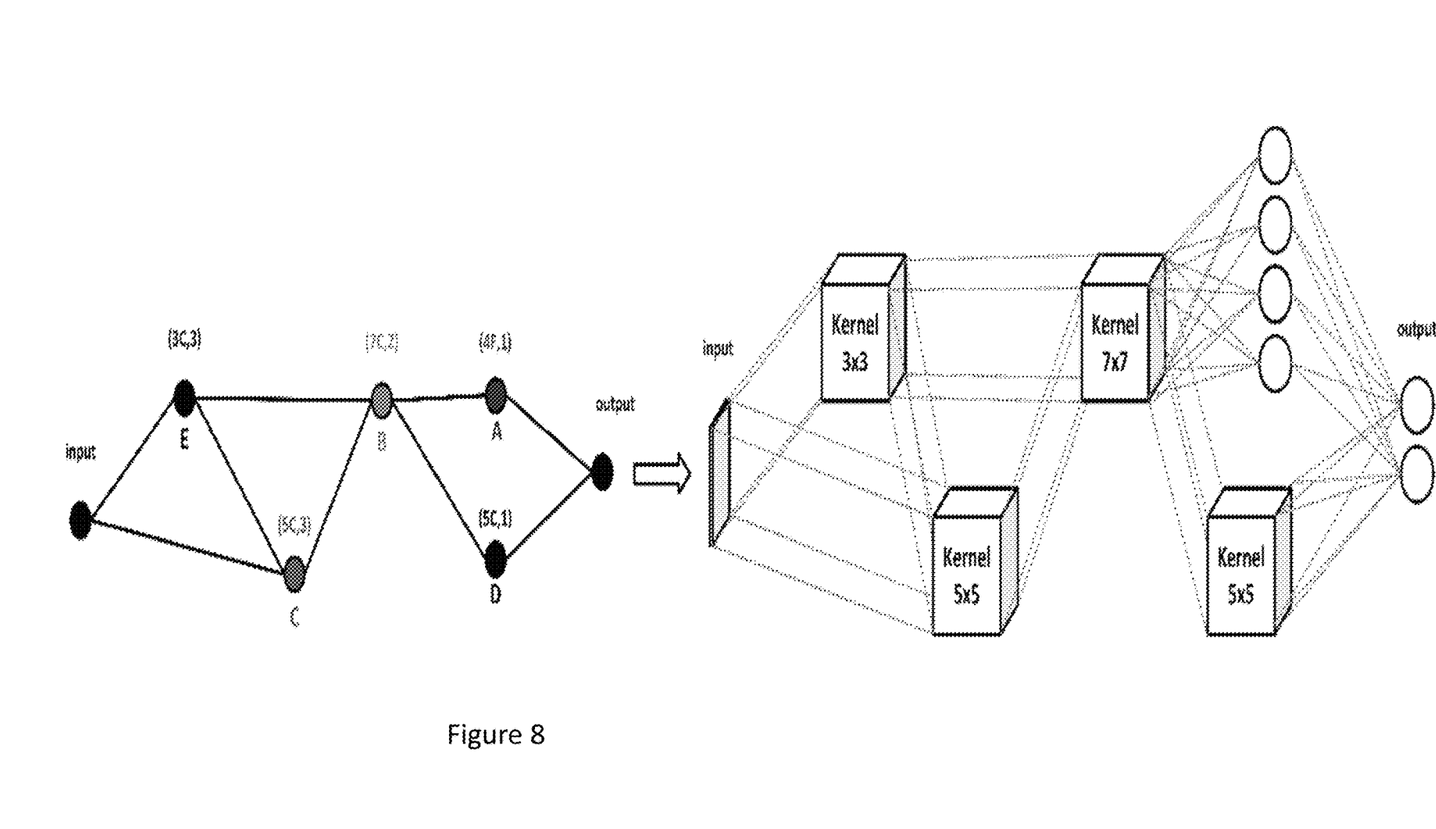
FIG. 8 shows the optimized graph of FIG. 7 being turned back to a synthesized neural network having a layer structure and connections corresponding to the optimized graph.

Referring now to FIG. 8, the final optimised graph is now mapped back to a synthesized neural network where each layer corresponds to a graph node with the structure specified by the graph node properties, step 44.

As shown in FIG. 8, right hand side, this involves a network comprising 4 interconnected convolutional layers and one fully connected layer. So while the kernel structure of the original component networks 1 . . . 3 has been maintained, the synthesized network is considerably smaller and demands far fewer resources than those of the original component networks.

The synthesized network produced according to the above method can be trained using for example, a Nestrov Momentum method for Binary Cross-Entropy loss function on the expanded CASIA 1000 dataset. Note that this training provides common back propagation within the synthesized network so that in fact the characteristic of the original component networks benefit from those of the other networks.

It is also possible to train the synthesized network based on a dataset augmented as described in co-filed U.S. application Ser. No. 15/413,312 entitled "A method of training a neural network".

Note that when a node accepts more than one input, such as nodes B and C of FIG. 8, the inputs are concatenated before being processed. There are a number of approaches which can be employed to do so.

Figure 9:
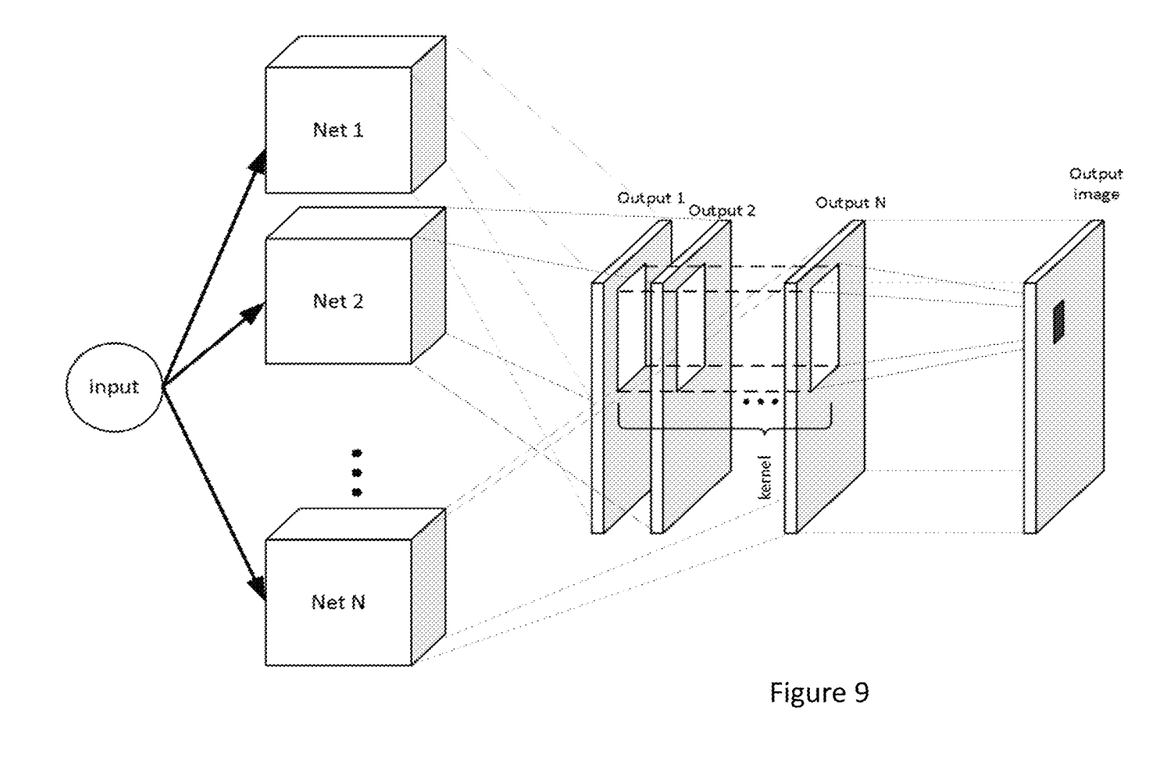
FIG. 9 shows one approach to merging network outputs as a common input.

In FIG. 9, three networks Net 1 . . . Net 3 provide outputs to a layer. In this case, the output of each network is a P channel image. The p outputs of the N networks are placed in a N*P channel convolutional layer and a kernel with a shape (k1, k2, N*P, P), where (k1, k2), is the size of the kernel, is placed after this layer to map it to a P channel image.

Figure 10:
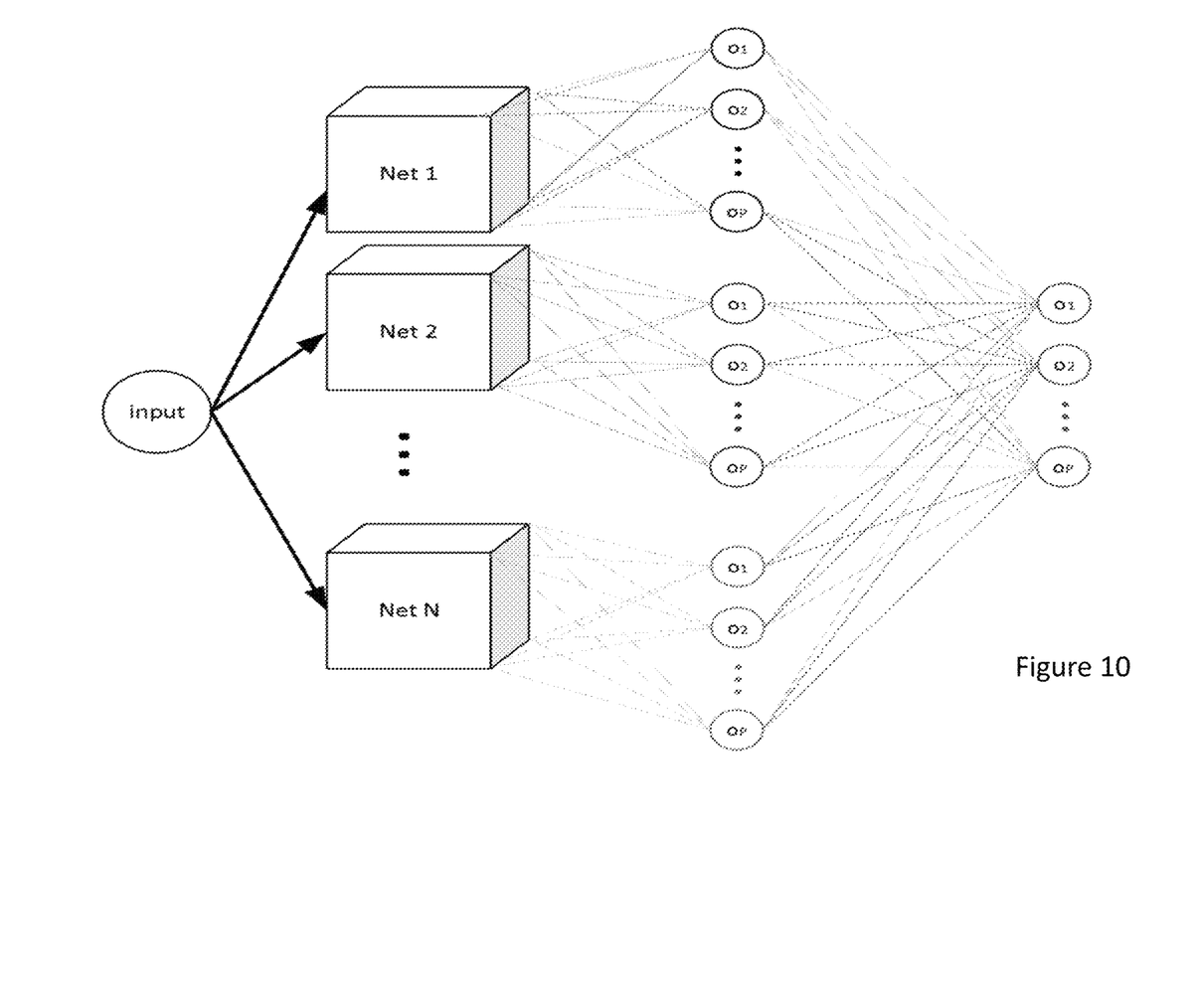
FIG. 10 shows an alternative approach to merging network outputs as a common input.

In an alternative, in FIG. 10, the output of each network Net 1 . . . Net 3 is a vector with length p (classic classification or data fitting). In this case the sets of outputs O1 . . . OP are concatenated to generate a neural layer of size p*N and a weight matrix of the size (p*N, p) which maps this layer to the output layer, with a length p.

Note that the present invention is applicable to any form of input not alone image. The input can for example comprise a feature vector or time-series (like sounds, medical data, etc) as long as this is labelled. In the case of images, image channels can be from any colour space including monochrome, intensity only images, RGB, YUV, LAB etc. Indeed processed versions of images including Integral Image (II); $I^2I$ image; histogram of gradients (HOG) image etc. can form one or more of the P channels for any given image. Also note that the channel information need not be limited to visible wavelengths and could represent infra-red information. Details for these and other forms of image can be found in PCT Application Nos. PCT/EP2016/060827 filed 13 May 2016 and PCT/EP2016/074519 filed 12 Oct. 2016 the disclosures of which are incorporated by reference.

In the above described embodiment, nodes corresponding to layers were compared based on their type, kernel size and distance from input/output. In variants of the above described embodiment, further properties can be taken into account.

Figure 11:
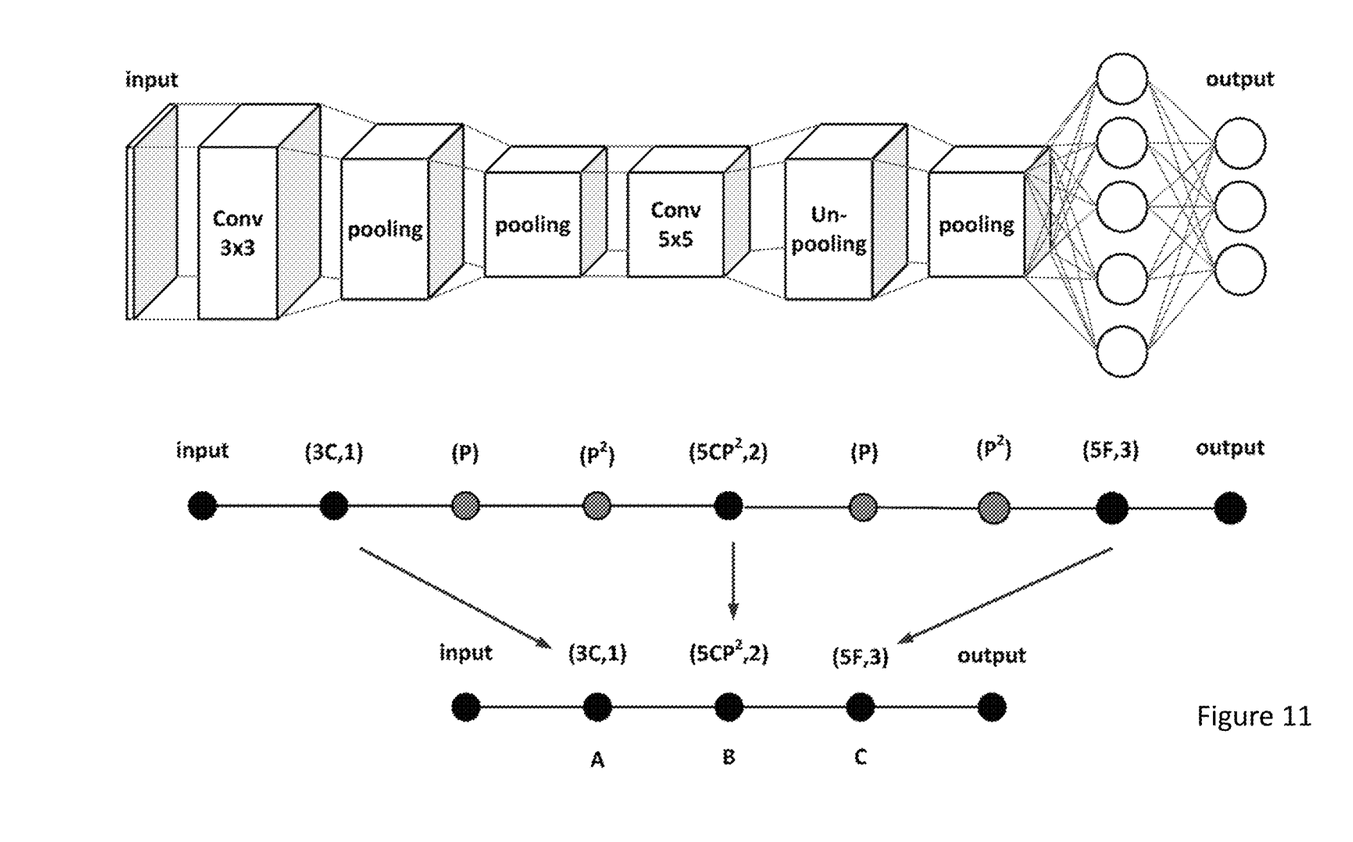
FIG. 11 (top) shows a deep neural network containing pooling (sub-sampling) and un-pooling layers and (middle, bottom) corresponding graphs with labels.

Referring now to FIG. 11 which illustrates one approach to dealing with pooling and un-pooling layers. In this embodiment, the structure properties "pooling" and "un-pooling" are sticky with respect to convolution. This means that if pooling is applied to a layer, the pooling property will stay with the data in the following convolutional layers, until the graph reaches an un-pooling or a fully connected layer. Here, each un-pooling layer removes (to an extent) the pooling of previous pooling layer(s); whereas a fully connected layer will remove all pooling properties from the node.

The reason for tracking pooling is to ensure that convolutional layers from different component networks are only merged within the synthesized network if they are operating on the same size of input. For example, take an input image of size [128×128] with two component networks processing this image. The first network doesn't apply pooling to the input image, therefore the image size will stay [128×128] in the convolutional layers of the network. The other network applies a [2×2] pooling operation to the image at some stage, and so after pooling the image size will be [64×64] within the network. Even if there are two downstream layers in these two networks with the same properties (kernel size, distance from input/output), in one of them the image size is [128,128] and in the other, thanks to the pooling, the image size is [64,64], and so the layers should not be merged.

On the other hand, the input size reaching a node for a fully connected layer doesn't matter, as the property of the node is the number of the neurons in the layer output. So no matter how many times the data has been pooled or un-pooled; after passing a fully connected layer, any pooling effect will be removed and the size of the output will be the same for every kind of input.

FIG. 11, top, shows a network including pooling and un-pooling layers and, middle, bottom, corresponding graphs with structural labels above the nodes and, in the case of the bottom graph, identifier labels below.

The reason for showing an intermediate graph is to indicate that in this example, pooling or unpooling layers do not affect the distance properties of structural labels.

In this example, node A is a 3×3 convolutional layer labelled (3C,1) as before. This layer is followed by two pooling layers whose effect is indicated within the $P^2$ component of the $(5CP^2,2)$ label for subsequent node B, a convolutional layer, as the pooling operation is sticky with respect to convolution. The properties for this node $(5CP^2,2)$ mean that node B applies 5×5 convolution on the data which has experienced pooling twice and it has distance 2 from the input node—thus ignoring in the distance property the intermediate pooling layers. Node C has the properties (5F,3) because, as a fully connected layer, this has removed all the pooling (and unpooling) properties already applied to the data.

Now once graph nodes for component graphs for a network having the same structural labels have been provided with identifier labels, in this case A . . . C, the graphs can be contracted as described above.

The example of FIG. 11 is based on the assumption that pooling and un-pooling layers are all the same size, for example 2×2 or 3×3. For networks which might contain different pooling and un-pooling sizes, the size should be considered in the labelling as well. For example a structural label (5C(2P)(3P),4) could be considered as relating to a 5×5 convolutional layer (5C), of distance 4 from input/output, which has been pooled twice: a 2×2 pooling (2P), a 3×3 pooling (3P). Alternatively, such a node could be labeled as (5C(6P),6) meaning that it corresponds with a 5×5 convolutional layer which has experienced a 6×6 (possibly one 2×2 and one 3×3) pooling operation. This could still be merged with 5×5 convolutional layer, the same distance from input/output that had experienced a single 6×6 pooling.

Also, note that in the above described embodiments, no distinction is made between the stride employed by convolutional layers. Striding is the steps that a sliding window of the convolutional kernel takes while computing the convolution of an input image with a layer. Selecting big steps can filter out some pixels from calculations, lower computational time and increase training speed. Striding can be considered as a mixture of convolution and pooling in one layer and for example a 5×5 convolutional layer with 3×3 striding and distance 4 from input/output, could be labeled as (5C(3P),4)—if there was no pooling/un-pooling applied before this layer. Otherwise the pooling/un-pooling of previous layers should be considered in the labelling of the current layer as explained above.

In further variants of the above described embodiments, steps 32-36 and 38-42 can be reversed so that the first labelling is based on distance from output and second labelling is based on distance from input.

Synthesized networks generated according to the above method can advantageously be executed on hardware such as described in PCT Application No. PCT/EP2016/081776 filed 19 Dec. 2016 (Ref: FN-481-PCT). Here convolution and fully connected layer information is loaded into a neural network engine to perform image processing as required.

The invention claimed is:

1. A method for synthesizing a neural network from a plurality of component neural networks, each component neural network comprising a combination of convolutional and/or fully-connected layers between at least one common input and at least one common output, the method comprising the steps of:

mapping each component neural network to a respective component neural network graph with each node of each component neural network graph corresponding to a layer of said component neural network and with each node connected to each other node in accordance with connections of the layers in said component neural network;

providing a first structural label for each node in accordance with the structure of the corresponding layer of the component neural network and a distance of the node from one of a given input or output;

merging the graphs for each component neural network into a single merged graph by merging nodes from component neural network graphs having the same first structural label;

providing a second structural label for each node of the single merged graph in accordance with the structure of the corresponding layer of the or each component neural network and a distance of the node from the other of a given input or output;

providing a contracted-merged graph by merging nodes of the merged graph having the same second structural label; and mapping the contracted-merged graph to a synthesized neural network with each node of the contracted-merged graph corresponding to a layer of said synthesized network and with each layer of the synthesized network connected to each other layer in accordance with connections of the nodes in the contracted-merged graph.

2. A method according to claim 1 wherein at least one of said component neural networks comprise one of a pooling or an un-pooling layer and wherein said first structural label and second structural labels for convolutional, pooling and un-pooling layers indicate an extent of pooling preceding such layers of a network.

3. A method according to claim 2 wherein said first structural label and second structural labels for fully-connected layers are independent of the extent of pooling preceding a fully-connected layer of a network.

4. A method according to claim 2 wherein a distance property of the first and second structural labels for each node is unaffected by pooling or un-pooling layers between said node and an input or output.

5. A method according to claim 2 wherein at least some of said convolutional layers involve striding and said first and second structural labels for convolutional, pooling and un-pooling layers indicate an extent of striding preceding such layers of a network.

6. A method according to claim 1 further comprising training the synthesized neural network.

7. A method according to claim 1 wherein said at least one common input comprises a P channel image.

8. A computer program product comprising a computer readable medium on which computer executable instructions are stored which when executed on a computing device are arranged to perform the method of claim 1.

9. A synthesized neural network produced according to the method of claim 1.

* * * * *